United States Patent Office 3,160,507
Patented Dec. 8, 1964

3,160,507
TWO-PACKAGE ANGEL FOOD CAKE MIX
Thomas P. Finucane, Hartsdale, N.Y., assignor to General Foods Corporation, White Plains, N.Y., a corporation of Delaware
No Drawing. Filed July 31, 1963, Ser. No. 299,075
18 Claims. (Cl. 99—94)

This invention relates to improved mixes of the foam-batter or non-shortening type for use in preparing angel food cakes, sponge cakes, chiffon cakes, and the like, wherein egg white is employed as a wipping agent to develop a foamy batter. More particularly, the invention is concerned with dry mixes for use in quickly and easily preparing foam-batter type cakes of increased height and good quality.

Cake mixes of the foam-batter type presently on the market usually comprise two packages, one of which contains dried egg white, sugar and, if desired, additives such as cream of tartar and sodium hexametaphosphate. The second package contains flour, additional sugar and, if desired, other additives such as cream of tartar, starch and flavor. To prepare a cake from such a mix, water is added to the ingredients of the first package to reconstitute the egg white which is then whipped into a foam into which the ingredients of the second package are folded. The resulting batter is then baked to provide the finished cake.

Such foam-batter cakes whether they be of the angel food, sponge or chiffon variety are generally considered difficult to prepare by reason of the care which must be exercised in developing the foam and maintaining the same while incorporating the other cake ingredients. Numerous cake improvers have been employed in the past with a view to increasing the ability of egg white to develop good foam volume and stability when folding farinaceous ingredients in the foam.

However, despite the advances made in cake making techniques and the considerable commercial success experienced by using such cake improvers, there are a number of disadvantages which still characterize foam-batter cake preparation. The cake mix recipe must be followed precisely. The period of time during which the egg white is whipped is critical as is the manner in which whipping is performed, viz., so-called hand and mechanical whips still produce different degrees of foam development. Then too, insufficient whipping by hand or mechanical means may not result in a sufficiently aerated foam, while excess whipping can result in a certain degree of foam destruction.

Difficulties stem from non-uniformity of raw materials from which the mixes are manufactured, and from uncleanliness of mixing utensil. It has been found that the whipping characteristics of dried egg white vary and that trace quantities of fat either in the mixing bowl or on the whipping apparatus can substantially impair foam development. Accompanying such impediments to batter preparation is a consequent reduction in foam height or volume. Also, when egg white (egg albumin) is used as the sole whipping agent, particularly when used at low levels in the interest of increased economy, its film forming property is such that an overexpansion of the air cells occurs upon baking with a resulting collapse of the cake upon cooling. Yet another problem in the production of cake mixes which will produce constantly successful cakes of the same quality is the variation in the farinaceous ingredient. This component of the mix contains a fatty anti-foaming agent in varying amounts, and as a result the quality of the cakes produced will vary with the level of anti-foaming agent present. Yet another problem is the greater variation in the milling of flour which causes significant differences in different lots of flour.

Even after development of the desired foam volume, the foam developed may not have the desired stability with the result that there may be a substantial reduction in foam height due to folding in of the ingredients of the second package. The folding in of ingredients frequently presents problems to the housewife since she will generally use the same folding technique each time she prepares an angel food cake. However, she is totally unaware of the possible variation in ingredients and in particular, of the amount of anti-foaming agent present in the mix she is using. Therefore, she is unable to compensate for such variations and will not produce consistently good cakes. In many instances, although the desired foam height may be accomplished, final cake volume or height after baking as well as the degree of quality of the cake may be inadequate.

A desirable feature for foam-batter type cake preparations is the provision of a dry mix which when made into a foam batter type cake, will contain insufficient anti-foaming agent to collapse the foam batter when the anti-foaming agent is added thereto, but sufficient anti-foaming agent to prevent excessive swelling of the foam batter on baking with consequent collapse of the cake on subsequent cooling. Heretofore, it has been impossible to prepare successful angel food cakes from mixes employing starch as the sole farinaceous ingredient. By adding a fatty anti-foaming agent to the starch it is possible to very carefully control the level of anti-foaming agent present and thereby permit the housewife to consistently obtain excellent cakes. The use of a starch as the sole farinaceous ingredient would be highly desirable since problems arising from variations in wheat flour and in the milling of such flour would be eliminated.

Objects of the present invention include the provision of reduced whipping or preparation time, increased foam height and foam stability, increased tolerance to the duration and character of whipping, decreased sensitivity to varying quality of cake ingredients and conditions of making cake volume or height and quality after baking, and particularly when employing, in the interest of economy, low levels of egg white (albumin) as the principal whipping agent. Yet another object of the present invention is the ability to prepare the desirable cakes produced by the present invention using a starch as the sole farinaceous ingredient. Other objects will be apparent from the discussion that follows.

As set forth in the co-pending U.S. patent application of Finucane et al., Serial No. 188,278, filed April 17, 1962, now issued Patent 3,096,179, it has been discovered that improved angel food cakes may be prepared from a two-package mix by controlling the anti-foaming agent present in the second package containing the farinaceous ingredient, particularly the fat introduced by the flour, or the added anti-foaming agent when starch is the sole farinaceous ingredient.

It has now been discovered that the objects of the present invention can be obtained in two-package foam batter type cake mixes containing egg white as the principal whipping agent and sugar in one package and farinaceous ingredient in the other package, the improvement which comprises employing as an addition to the principal whipping agent (egg white) in the package containing the egg white and sugar, an auxiliary whipping agent; the package containing the farinaceous ingredient having present an aggregate level of a fatty egg white anti-foaming agent in an amount insufficient to cause collapse of the foam batter and prevent sufficient expansion of the cells of the egg white foam batter on baking but sufficient to prevent excessive swelling of the foam batter on baking and subsequent collapse of the cake on cooling. The auxiliary whipping agent may be partially degraded soy protein, solely or in combination with an alkali metal hexametaphosphate.

According to this invention, results very superior to those obtained by the use of either partially degraded soy protein or an alkali metal hexametaphosphate alone are obtained when the two are used as an auxiliary whipping agent combination, as in such combinations, the two apparently have a synergistic effect upon each other so that the time of preparation is decreased while the foam and cake height are increased with a concurrent increase in tolerance of the mix to the level of anti-foaming agent present in the mix.

It has also been found that when partially degraded soy protein in combination with an alkali metal hexametaphosphate is added as an auxiliary whipping agent, the film forming ability of the egg white is weakened so as to avoid collapse of the cakes upon cooling after baking. This permits the creation of a foam batter which will not overexpand during baking and is sufficiently stable when the level of fatty anti-foaming agent is controlled so that desirable cakes can be produced which will not collapse upon cooling. At the same time the combination of partially degraded soy protein and an alkali metal hexametaphosphate permits the foam batter to be whipped faster than heretofore possible and obtain a foam batter of increased height.

In view of the weakened film forming ability of the egg white created by the use of the auxiliary whipping agent combination, it has further been found that it is necessary to control the anti-foaming agent present in the mix. By regulating the amount of flour fat or other fatty anti-foaming agent when used in a mix containing the auxiliary whipping agent combination, it is possible to prevent collapse of the foam batter and insufficient expansion of the cells of the egg white foam batter upon baking when the anti-foaming agent is added thereto and also prevent excessive swelling of the foam batter on baking and subsequent collapse of the cake on cooling while at the same time obtaining the desirable features of the present invention. Levels of fatty anti-foaming agent of 0.04% to 9.0% by weight of the egg white in the mix and present in the package containing the farinaceous ingredient have been found to produce very desirable cakes.

As used in the present invention, the term "farinaceous ingredient" refers to all of the various starches, flours and mixtures of the same obtained from cereals, tubers, roots and the like. When flour is the farinaceous ingredient employed, its fat content must be reduced although not completely eliminated if the benefits of the present invention are to be realized. This reduction can be effected by solvent extraction or by dilution of the flour with the relatively fat-free starch. When starch is the sole farinaceous ingredient employed, it is possible to obtain a wide variation in texture depending on the preference of the consumer market merely by varying the level of fatty anti-foaming agent added. Thus, it is possible to use the same starch to obtain cakes which can vary from fine textured cakes to coarse textured, open grain cakes.

Cake flour, a fraction of wheat flour, generally contains about 1.3% fat as determined by the acid hydrolysis method, about 0.8% as determined by extraction with hexane and about 1.1% as determined by extraction with ethanol (95%). The hexane-extractable fat in starch is about 0.2% and that in the extracted flour discussed hereinafter is about 0.3%. The fat is only partially extracted from the flour using ethanol (95%) because exhaustive extraction is impractical. Flour extracted by other solvents and to different degrees may also be employed, of course.

In addition to the wheat flour and starch normally employed in angel food cake mixes, flours and starches derived from other materials such as corn, rice, arrowroot, potato, tapioca, sago, sorghum, soy, and the like, may also be employed. Such materials will seldom be used by themselves but more often in combination with each other and most likely in combination with wheat starch or wheat flour. Their use presents slightly different problems in connection with controlling the fat content of the mix. For example, potato starch is practically devoid of fat whereas soy flour is relatively high in fat content as are the other grades of wheat flour that are not ordinarily employed as cake flour.

Fat reduction in the mix can be effected by solvent extraction of a fraction of the cake flour or by dilution of the flour with relatively fat-free starch. While the fat content of flour has, for all practical purposes, been found the element to be controlled in order to provide such an improved cake mix, various other related materials, such as fatty acids, soaps, fatty acid amides, lipides, lipo-proteins, mineral oils, fatty alcohols, fatty esters, waxes, phospho-lipides, and the like, will conceivably function in an equivalent manner. Such materials would be additives to the farinaceous material and do not occur in ordinary foam-batter cake ingredients.

There are several different ways in which the flour fat content of the foam-batter cake mix may be controlled. These include:

(1) The use of partially extracted flour having the desired fat content.
(2) A more completely extracted flour or a starch to which fatty anti-foaming agent has been added either to all of the flour or starch or to a portion thereof.
(3) Combinations of starch with regular, untreated flour.
(4) Combinations of extracted flour with regular, untreated flour.
(5) Starch to which fatty anti-foaming agent has been added.

It is somewhat difficult to control the fat content in the case of the first embodiment mentioned above and greater ease of control is encountered with the second embodiment. Here, however, care should be taken to secure the uniform distribution of the flour fat added back to the extracted flour. This can be accomplished by adding the dissolved fat to the flour or starch uniformly, removing the solvent by evaporation and further insuring uniform distribution by tumbling the flour or starch or otherwise mixing it. Likewise, good mixing, as by tumbling, should be employed in the third and fourth embodiments above in order to secure uniform distribution of the regular, untreated flour throughout the starch or extracted flour. The fifth embodiment is the easiest to control and for reasons set forth heretofore is the most desirable embodiment.

Experience with the various formulations capable of providing the cake mixes of the present invention indicates that the flour fat as determined by hexane extraction that may be contained in the second package of the mix and provide the advantages of the present invention is of the order of 0.04–1.5% by weight of the dried egg white in the mix. Cakes prepared from mixes containing the lower levels of fat are more susceptible to implosion that cakes prepared from mixes containing the very high levels of fat and are fine textured and low in volume. This experience also indicates that when a fatty acid such as stearic acid is employed as the fatty antifoaming agent in a cake mix containing starch as the sole farinaceous ingredient, then the stearic acid may be employed at a level of 0.9–9.0% by weight of the dried egg white in the mix and preferably at a level of 4.0–5.0% by weight of the dried egg white in the mix. Cakes prepared from mixes containing the lower levels of fat are more susceptible to implosion than cakes prepared from mixes containing the very high levels of fat and are fine texture and low in volume. Cakes prepared from mixes containing the preferred level of stearic acid have the best volumes and textures. Furthermore, it is possible to employ either stearic acid by itself or a combination of stearic acid and other fatty acids or fats to obtain the desired results. While other anti-foaming agents such as those mentioned specifically above should be employed in somewhat different amounts, said amounts will be of the same order of magnitude and can be readily determined by baking cakes from a series of mixes containing progressively increasing amounts of such other anti-foaming agents.

Even with a particular anti-foaming agent such as the hexane extractable flour fat or a fatty acid to which the present invention is particularly directed, the optimum levels to be employed depend upon other factors such as the distribution of the anti-foaming agent, whether it is contained on the surface of the flour or other carrier or is held within the flour granule, the ratio of farinaceous ingredient to egg white and other factors. For example, the optimum amount of fat is lowered when a higher ratio of flour or other farinaceous ingredient to egg white is employed.

The results provided by the present invention may be obtained either by employing a fatty anti-foaming agent which is effective when the second package is folded into the first package, such agents being those which are liquid or semi-liquid at the temperatures employed during folding, or on the other hand, the results may be obtained by employing an agent such as stearic acid or other fatty anti-foaming agent such as high melting point fats which are solid when the second package is being folded into the first but become liquid upon baking. Similar results may be obtained by coating or encapsulating the fat content of the mix with a water-soluble material such as gelatin, pectin, and the like which is relatively slow to dissolve at room temperatures so that the fat does not come into play until after folding has been completed.

When a fatty acid is employed in combination with starch or flour its effect may be controlled by dry blending it with the farinaceous ingredient or by coating it on the farinaceous ingredient. Typical of the fatty acids which may be employed are lauric acid, myristic acid, palmitic acid, stearic acid, arachidic acid, behenic acid, oleic acid, and linoleic acid. When stearic acid is the fatty acid employed, it is preferred to dry blend it in a finely powdered form with the farinaceous ingredient.

In employing regular, untreated flour with starch in a two-package mix containing 40 g. of dried egg white, the flour may range from as little as 0% to as high at 40% of the farinaceous ingredient, the remainder being starch, provided the hexane-extractable fat in the mix is maintained at 0.04–1.5% by weight of the dried egg white in the mix. It is preferred, however, to employ the flour in a range of about 5–20%. This generally provides hexane-extractable fat in an amount equal to about 0.5–1.0% of the dried egg white. Where regular, untreated wheat flour is employed in combination with, say, ethanol extracted wheat flour containing about 0.3% hexane-extractable fat, it is preferred to employ the unextracted flour in a range of about 25–40% of the farinaceous ingredient and solvent extracted flour in a range of about 75–60% of the farinaceous ingredient. This generally provides hexane-extractable fat equal to about 1.2–1.5% of the dried egg white in the mix.

The soy protein employed as the auxiliary whipping agent in the present invention is partially degraded or hydrolyzed by any well known technique such as by enzyme, alkali or acid treatment. Such techniques are well known in the art and may be made in any well known manner, for example, as taught in U.S. Patent Nos. 2,489,173; 2,489,208; 2,502,029; 2,502,482; 2,588,419. Preferably, when employed as the sole auxiliary whipping agent, the partially degraded soy protein is employed at a level of about 0.5–25% by weight of the dried egg white in the mix.

The alkali metal hexametaphosphates that may be employed as one of the auxiliary whipping agents in the present invention include those of sodium, potassium, lithium, rubidium, cesium and ammonium. The ammonium radical is for many purposes classified with the alkali metals and is also so classified for the present purpose. The hexametaphosphates of lithium, rubidium and cesium, while operative in the present invention, are not commercially available for the most part. The hexametaphosphates are of somewhat uncertain composition and various formulas have been proposed for them; sodium hexametaphosphate, for example, has been indicated to be $Na_6P_6O_{18}$, $Na_6(PO_3)_6$ and a mixture of $$Na_5[Na(PO_3)_6]$$

$Na_4[NA_2(PO_3)_6]$ and $Na_6(PO_3)_6$. 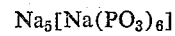 It has also been suggested that the hexametaphosphate occurs in the bis and tris forms. Some hexametaphosphates on the market are prepared in such a manner that other materials are provided in admixture with the hexametaphosphates. For example, one of the commercially available sodium hexametaphosphates is prepared with an excess of sodium carbonate so that solutions of the final product have a higher pH than is obtained with pure sodium hexametaphosphate. Such variations are for the most part usable and are intended to be included within the scope of the present invention.

The auxiliary whipping agent combination is incorporated into the first package together with the dried egg white, sugar and other additives, such as cream of tartar. The levels of auxiliary whipping agent combination required in this first package will vary depending upon the type of foam batter cake which is to be prepared. Generally, the present auxiliary whipping agent combination has been found to develop acceptable foam batters when the partially degraded soy protein is present in the level of 0.1–20% and the alkali metal hexametaphosphate present at a level of 0.4–15% of the weight of the egg white in the first package; the principal whipping agent, egg white, being present at a level of between 30–45% and the remaining principal ingredient by weight being sugar. The amount of partially degraded soy protein and alkali metal hexametaphosphate employed will vary inversely as the amount of dried egg white present in the mix. The partially degraded soy protein and alkali metal hexametaphosphate should not exceed an amount in proportion to the egg white wherein the foam system has substantially large bubbles which result in large voids or holes in the baked cake thereby providing an undesirable very coarse grain.

Generally, the level of auxiliary whipping agent necessary will vary in accordance with the amount of anti-foaming agent present. Thus, the package should include a high percentage of starch or hexane extracted flour, for example, in the farinaceous ingredients. Reduction of the amount of the anti-foaming agent generally lowers the level of degraded soy protein required for optimal results. On the other hand, increased amounts of degraded soy protein reduce the period required for whipping the batter and also enable a hand whip, as distinguished from a machine whip operation, to be more readily practiced in preparing the required foam batter.

A typical two-package dry cake mix for use in preparing angel food cake in accordance with the present invention is as follows.

Example 1

| Package 1: | G. |
|---|---|
| Degraded soy protein | .3 |
| Dried egg white | 39.1 |
| Coating sugar (sucrose) | 79.1 |
| Sodium hexametaphosphate | 1.5 |
| Package 2: | |
| Coating sugar (sucrose) | 248.1 |
| Cake flour | 77.0 |
| Wheat starch | 33.0 |
| Cream of tartar | 2.46 |
| Sodium chloride | 1.34 |
| Calcium stearate | .07 |

To prepare a foam batter the ingredients of package 1 are placed in a large bowl with about 1⅓ cups of water at room temperature. The ingredients are stirred until dissolved in the water and are then beaten with a sturdy egg beater, flat wire whip or at the highest speed in an electric mixer such as a No. 10 model Sunbeam Mixmaster at a speed setting of 10 until very stiff peaks form. This usually takes between 2–3 minutes, a shorter whip being required at relatively high levels of degraded soy protein, to wit, 0.5% of the ingredients in package 1. Whipping for periods in excess of 3 minutes is usually unnecessary because of the ability to quickly develop foam. The foam developed remains substantially stable during folding in of the ingredients of the second package. About ¼ of the ingredients of this second package may be sifted into the egg white foam which is folded over to thoroughly distribute the farinaceous ingredients therein. Then, in a plurality of separate additions, the remaining contents of the second package are similarly folded in to provide the desired foam batter. Flavoring may be added, such as ½ teaspoon of vanilla or ¼ teaspoon of almond or both.

The foam batter is then poured into an ungreased 10″ tube pan or a 13 x 9 x 2 in. pan and is cut gently therethrough to remove any large air bubbles. The batter is then baked for about 30 minutes in a moderate oven (375° F.). The cake is done when the top springs back after lightly pressing with the finger. The cake is then cooled by turning the pan upside down at once and letting it stand until cool (1–2 hours).

With regard to the sugar in such dry mixes, it is well known that incorporation of sucrose in egg white materially aids in its being whipped and, moreover, provides a whip of superior texture and quality; the level of coating sugar employed in package 2 of the two-package mix will, however, have an upper limit above which a certain degree of impairment of foam development is experienced. Increased levels of partially degraded soy protein and alkali metal hexametaphosphate function to increase the amount of sugar which may be used in the first package of the two-package mix allowing the amount of sugar in the second package to be substantially reduced so that there is less material to be folded into the foam. With partially degraded soy protein and alkali metal hexametaphosphate present the amount of sucrose that may be employed in the first package is somewhere between 1 and 2 times the weight of the dried egg white, the preferred amount being in the order of 1½ times the dried egg white.

*Example 2*

An angel food cake was prepared as in Example 1 except that the farinaceous ingredient in the second package was comprised solely of wheat starch containing about 0.2% hexane extractable fat to which had been added sufficient flour fat to obtain an aggregate fat level in the second package of 1.0% by weight of the egg white in the mix.

The resulting cake was a fine textured cake having a height of about 120 mm.

Thus, it will be seen that the employment of partially degraded soy protein and an alkali metal hexametaphosphate as an auxiliary whipping agent combination has marked advantages in multi-package foam-batter cake mix preparations. In all of such cake preparations the whipping period is substantially reduced and tolerance to mixing has been increased so that as a practical matter over- and under-whipping has been eliminated. By sufficiently controlling the level of partially degraded soy protein and alkali metal hexametaphosphate, the accompanying increase in whipping tolerance does not sacrifice the fine grain and texture of foam-batter cakes. The foregoing whipping tolerances are achieved concurrently with a reduction in sensitivity to varying qualities of egg white as the principal whipping agent. By reason of the marked increase in the aerating properties of the egg white generally, a superior foam height and foam stability results, having increased tolerance to the presence of high levels of sugar as well as farinaceous ingredients and producing a cake product of improved volume or height with an increased ease and simplicity of batter preparation. It is now possible to economize on the cost of such products by reducing the level of the dried egg white to a point which heretofore resulted in complete cake failures, but which, with the use of partially degraded soy protein, an alkali metal hexametaphosphate and a controlled level of fatty anti-foaming agent results in highly desirable, successful cakes.

This application is a continuation-in-part of U.S. Serial No. 450,805, filed August 18, 1954 (now abandoned); U.S. Serial No. 705,147, filed December 26, 1957 (now abandoned); and U.S. Serial No. 857,514, filed December 7, 1959 (now abandoned).

While the present invention has been described with particular reference to specific examples, it is not to be limited thereby, but reference is to be had to the appended claims for a definition of its scope.

What is claimed is:

1. In a two-package angel food cake mix containing egg white as the principal whipping agent and sugar in one package and farinaceous ingredient in the other package, the improvement which comprises employing in addition to the principal whipping agent in the package containing said whipping agent, partially degraded soy protein as an auxiliary whipping agent, the package containing said farinaceous ingredient having present an aggregate level of a fatty anti-foaming agent in an amount insufficient to cause collapse of the foam batter and prevent sufficient expansion of the cells of the egg white foam batter upon baking but in an amount sufficient to prevent excessive swelling of the foam batter on baking and subsequent collapse of the cake on cooling, said anti-foaming agent being present at a level of 0.04–9.0% by weight of the egg white in the mix.

2. The angel food cake mix according to claim 1 wherein the fatty anti-foaming agent is liquid at the temperatures employed during folding and is present at a level of 0.04–1.5% by weight of the dried egg white in the mix.

3. The angel food cake mix according to claim 1 wherein the fatty anti-foaming agent is one which remains solid until said mix is baked and is present at a level of 0.9–9.0% by weight of the egg white in the mix.

4. The angel food cake mix according to claim 3 wherein the fatty anti-foaming agent employed is stearic acid.

5. The angel food cake mix according to claim 4 wherein the stearic acid is present at a level of 4.0–5.0% by weight of the dried egg white in the mix.

6. The angel food cake mix according to claim 2 wherein the fatty anti-foaming agent employed is a hexane extractable fat.

7. The angel food cake mix according to claim 1 wherein the farinaceous ingredient is comprised of starch.

8. The angel food cake mix according to claim 1 wherein the farinaceous ingredient is comprised of about 25–40% wheat flour and about 75–60% solvent extracted wheat flour.

9. The angel food cake mix according to claim 1 wherein the farinaceous ingredient is comprised of about 25–40% wheat flour and about 75–60% solvent extracted wheat flour, said farinaceous ingredient having a hexane-extractable fat content within the range of about 1.2–1.5% of the dried egg white present in the mix.

10. In a two-package angel food cake mix containing egg white as the principal whipping agent and sugar in one package and farinaceous ingredient in the other package, the improvement which comprises employing in addition to the principal whipping agent in the package containing said whipping agent, partially degraded soy protein as an auxiliary whipping agent, the package containing said farinaceous ingredient having present an aggregate level of a fatty anti-foaming agent in an amount insufficient to cause collapse of the foam batter and prevent sufficient expansion of the cells of the egg white foam batter upon baking but in an amount sufficient to prevent excessive swelling of the foam batter on baking and subsequent collapse of the cake on cooling, said partially degraded soy protein being present at a level of 0.5–25% by weight of the egg white in the mix and said anti-foaming agent being present at a level of 0.04–9.0% by weight of the egg white in the mix.

11. In a two-package angel food cake mix containing egg white as the principal whipping agent and sugar in one package and farinaceous ingredient in the other package, the improvement which comprises employing as an addition to the principal whipping agent in the package containing said whipping agent, an auxiliary whipping agent combination comprising partially degraded soy protein and an alkali metal hexametaphosphate, the package containing said farinaceous ingredient having present an aggregate level of a fatty anti-foaming agent in an amount insufficient to cause collapse of the foam batter and prevent sufficient expansion of the cells of the egg white foam batter on baking but in an amount sufficient to prevent excessive swelling of the foam batter on baking and subsequent collapse of the cake on cooling, said fatty anti-foaming agent being present at a level of 0.04–9.0% by weight of the egg white in the mix.

12. In a two-package angel food cake mix containing egg white as the principal whipping agent and sugar in one package and farinaceous ingredient in the other package, the improvement which comprises employing as an addition to the principal whipping agent in the package containing said whipping agent, an auxiliary whipping agent combination comprising partially degraded soy protein and sodium hexametaphosphate, the package containing said farinaceous ingredient having present an aggregate level of a fatty anti-foaming agent in an amount insufficient to cause collapse of the foam batter and present sufficient expansion of the cells of the egg white foam batter on baking but in an amount sufficient to prevent excessive swelling of the foam batter on baking and subsequent collapse of the cake on cooling, said fatty anti-foaming agent being present at a level of 0.04–9.0% by weight of the egg white in the mix.

13. In a two-package angel food cake mix containing egg white as the principal whipping agent and sugar in one package and farinaceous ingredient in the other package, the improvement which comprises employing as an addition to the principal whipping agent in the package containing said whipping agent, an auxiliary whipping agent combination comprising partially degraded soy protein and an alkali metal hexametaphosphate, the package containing said farinaceous ingredient having present an aggregate level of a fatty anti-foaming agent in an amount insufficient to cause collapse of the foam batter and prevent sufficient expansion of the cells of the egg white foam batter on baking but in an amount sufficient to prevent excessive swelling of the foam batter on baking and subsequent collapse of the cake on cooling, said partially degraded soy protein and alkali metal hexametaphosphate being employed in an amount sufficient to effect improved whipping tolerances for the egg white, said partially degraded soy protein being present at a level of 0.1–20% of the weight of the egg white in the first package, said alkali metal hexametaphosphate being present at a level of 0.4–15% of the weight of the egg white in the first package, the egg white being present at a level of between 30–45% of said first package, and said fatty anti-foaming agent being present at a level of 0.04–9.0% by weight of the egg white in the mix.

14. The angel food cake mix according to claim 13 wherein the alkali metal hexametaphosphate is sodium hexametaphosphate.

15. The angel food cake mix according to claim 13 wherein the farinaceous ingredient is comprised of wheat starch and wheat flour.

16. The angel food cake mix according to claim 13 wherein the farinaceous ingredient is comprised of wheat starch.

17. The angel food cake mix according to claim 13 wherein the farinaceous ingredient is comprised of about 25–40% wheat flour and about 75–60% solvent extracted wheat flour.

18. The angel food cake mix according to claim 13 wherein the farinaceous ingredient is comprised of about 25–40% wheat flour and about 75–60% solvent extracted wheat flour, said farinaceous ingredient having a hexane-extractable fat content within the range of about 1.2–1.5% of the dried egg white present in the mix.

References Cited in the file of this patent

UNITED STATES PATENTS

| | | |
|---|---|---|
| 1,170,474 | Beatty | Feb. 1, 1916 |
| 2,176,079 | Katzman | Oct. 17, 1939 |
| 2,502,029 | Sair et al. | Mar. 28, 1950 |
| 2,588,419 | Sevall et al. | Mar. 11, 1952 |
| 2,671,730 | Finucane et al. | Mar. 9, 1954 |

UNITED STATES PATENT OFFICE
CERTIFICATE OF CORRECTION

Patent No. 3,160,507            December 8, 1964

Thomas P. Finucane

It is hereby certified that error appears in the above numbered patent requiring correction and that the said Letters Patent should read as corrected below.

Column 1, line 72, for "greater" read -- great --; column 6, line 10, after "mixture of" insert -- $Na_5[Na(PO_3)_6]$, --; line 11, strike out "$Na_5[Na(PO_3)_6]$"; column 9, line 39, for "present" read -- prevent --.

Signed and sealed this 13th day of April 1965.

(SEAL)
Attest:

ERNEST W. SWIDER
Attesting Officer

EDWARD J. BRENNER
Commissioner of Patents